(12) United States Patent
Kobayashi et al.

(10) Patent No.: US 7,938,481 B2
(45) Date of Patent: May 10, 2011

(54) VEHICLE FRAME STRUCTURE

(75) Inventors: Takeshi Kobayashi, Saitama (JP); Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 12/200,326

(22) Filed: Aug. 28, 2008

(65) Prior Publication Data

US 2009/0058146 A1    Mar. 5, 2009

(30) Foreign Application Priority Data

Aug. 31, 2007   (JP) .................... 2007-226634

(51) Int. Cl.
*B62D 25/20* (2006.01)
(52) U.S. Cl. ..................................... 296/204
(58) Field of Classification Search .......... 296/203.01, 296/204, 203.02, 75, 193.07; 280/163, 291; 180/90.6; 74/564
See application file for complete search history.

(56) References Cited

U.S. PATENT DOCUMENTS

| | | | | |
|---|---|---|---|---|
| 3,047,088 A | * | 7/1962 | Murrell | 180/90.6 |
| 4,955,664 A | * | 9/1990 | Friedrich | 296/204 |
| 4,984,838 A | * | 1/1991 | Kim | 296/75 |
| 5,327,989 A | * | 7/1994 | Furuhashi et al. | 180/248 |
| 6,073,515 A | * | 6/2000 | Elton et al. | 74/564 |
| 7,677,646 B2 | * | 3/2010 | Nakamura | 296/190.08 |
| 7,695,056 B2 | * | 4/2010 | Hanson et al. | 296/204 |
| 2006/0254835 A1 | * | 11/2006 | Reffitt | 180/21 |
| 2007/0205626 A1 | * | 9/2007 | Ohtsubo et al. | 296/75 |
| 2007/0256880 A1 | * | 11/2007 | Ball | 180/311 |
| 2007/0257519 A1 | * | 11/2007 | Hanson et al. | 296/204 |
| 2008/0100098 A1 | * | 5/2008 | Kobayashi et al. | 296/204 |
| 2010/0012412 A1 | * | 1/2010 | Deckard et al. | 180/90.6 |

FOREIGN PATENT DOCUMENTS

JP    2006-103370 A    4/2006

* cited by examiner

*Primary Examiner* — Hilary Gutman
(74) *Attorney, Agent, or Firm* — Birch, Steward, Kolasch & Birch, LLP

(57) ABSTRACT

A vehicle frame structure allowing a footrest to support an even larger force. A foot operation zone and a driver's footrest are disposed between a lower cross member disposed so as to extend laterally across front ends of a pair of left and right lower main frames and an upper cross member disposed upward of, and extending in parallel with, the lower cross member. Connection frames connecting the lower cross member with the upper cross member are disposed between the foot operation zone and the driver's footrest.

20 Claims, 15 Drawing Sheets

VEHICLE FRAME STRUCTURE

CROSS-REFERENCE TO RELATED APPLICATIONS

The present application claims priority under 35 USC 119 to Japanese Patent Application No. 2007-226634 filed on Aug. 31, 2007 the entire contents of which are hereby incorporated by reference.

BACKGROUND OF THE INVENTION

1. Field of the Invention

The present invention relates to an improved frame structure for a vehicle.

2. Description of Background Art

A vehicle is known that includes a floor portion on which an occupant can place his or her feet. See, for example, Japanese Patent Laid-Open No. 2006-103370.

FIG. 1 of Japanese Patent Laid-Open No. 2006-103370 includes a vehicle 10 with a floor portion 32 disposed on a lower portion of a cabin. When an occupant gets on or off the vehicle 10 or sits on a seat 25 to drive the vehicle 10, he or she places his or her feet on the floor portion 32.

When the occupant operates an accelerator pedal or a brake pedal with his/her right foot, he or she has his/her left foot resting on the floor portion 32. When, for example, the vehicle is driven on a rough road or a slope, the occupant typically wants to support his/her body by staying on his/her left foot so that he/she can maintain his/her position. In this case, the occupant can better stay on his/her left foot, if there is a footrest provided in a direction in which he/she exerts his/her force through his/her left foot, instead of the flat floor portion 32. Preferably, the footrest has a higher stiffness so that it can support a large foot pressure.

SUMMARY AND OBJECTS OF THE INVENTION

It is an object of an embodiment of the present invention to provide a vehicle frame structure supporting a footrest capable of supporting a large foot pressure.

In accordance with an embodiment of the present invention, there is provided a frame structure for a vehicle that includes a pair of left and right lower main frames, a front frame, a seat support frame, a rear frame, floor sub-frames, step sub-frames, and a dash panel. The pair of left and right lower main frames extends longitudinally along the vehicle. The front frame includes front portions of the lower main frames and support front wheels. The seat support frame, disposed at intermediate portions of the lower main frames, supports the seats. The rear frame, disposed at rear portions of the lower main frames, supports rear wheels. The floor sub-frames support a floor, on which occupants sitting in the seats rest their feet. The step sub-frames support steps are one step lower than the floor. The dash panel is disposed near the floor and delimits a side of a cabin from a side of the front wheels. The dash panel includes a foot operation zone facing a foot operation space, in which a driver of the occupants operates an accelerator pedal, a brake pedal, and other foot operation members with his or her first foot, and a footrest, on which the driver rests his or her second foot. The vehicle frame structure is characterized in that the foot operation zone and the footrest are disposed between a lower cross member disposed so as to extend laterally across front ends of the pair of left and right lower main frames and an upper cross member disposed upward of, and extending in parallel with, the lower cross member. The vehicle frame structure is further characterized in that connection frames connecting the lower cross member with the upper cross member are disposed between the foot operation zone and the footrest.

As an effect, the dash panel including the foot operation zone and the footrest can be supported by the connection frames. The footrest is not therefore easily flexed even by a large pressure applied thereto.

In accordance with an embodiment of the present invention, a bulkhead is formed by a curving part of the dash panel between the foot operation zone and the footrest and the connection frame is disposed inside the bulkhead.

As an effect, the partly curved dash panel enhances the rigidity of the dash panel itself.

In accordance with an embodiment of the present invention, portions across both ends of the lower cross member and the upper cross member are covered with the dash panel.

As an effect, because the connection frames connecting the lower cross member with the upper cross member do not exist on the side of both ends of the lower cross member and the upper cross member, the dash panel covering the portions across both ends of the lower cross member and the upper cross member can be shaped without being restricted by the connection frames.

In accordance with an embodiment of the present invention, the foot operation zone and the footrest are disposed between the lower cross member, disposed so as to extend laterally across the front ends of the pair of left and right lower main frames, and the upper cross member, disposed upward of and in parallel with the lower cross member, and the connection frame connecting the lower cross member with the upper cross member is disposed between the foot operation zone and the footrest. This allows the connection frame to receive foot pressure acting on the footrest. When the driver rests his or her foot on the footrest to support his or her body during driving, a large load acting on the footrest can be received.

In accordance with an embodiment of the present invention, the bulkhead is formed by curving part of the dash panel between the foot operation zone and the footrest and the connection frame is disposed inside the bulkhead. The partly curved dash panel enhances rigidity of the dash panel. This also helps the footrest receive a large load. A boundary between the foot operation zone and the footrest is thus made clear, allowing the driver to deploy his or her feet easily.

In accordance with an embodiment of the present invention, there is no frame involved connecting both ends of the lower cross member and the upper cross member, though the portions across both ends of the lower cross member and the upper cross member are covered with the dash panel. This improves a degree of freedom in design of the dash panel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
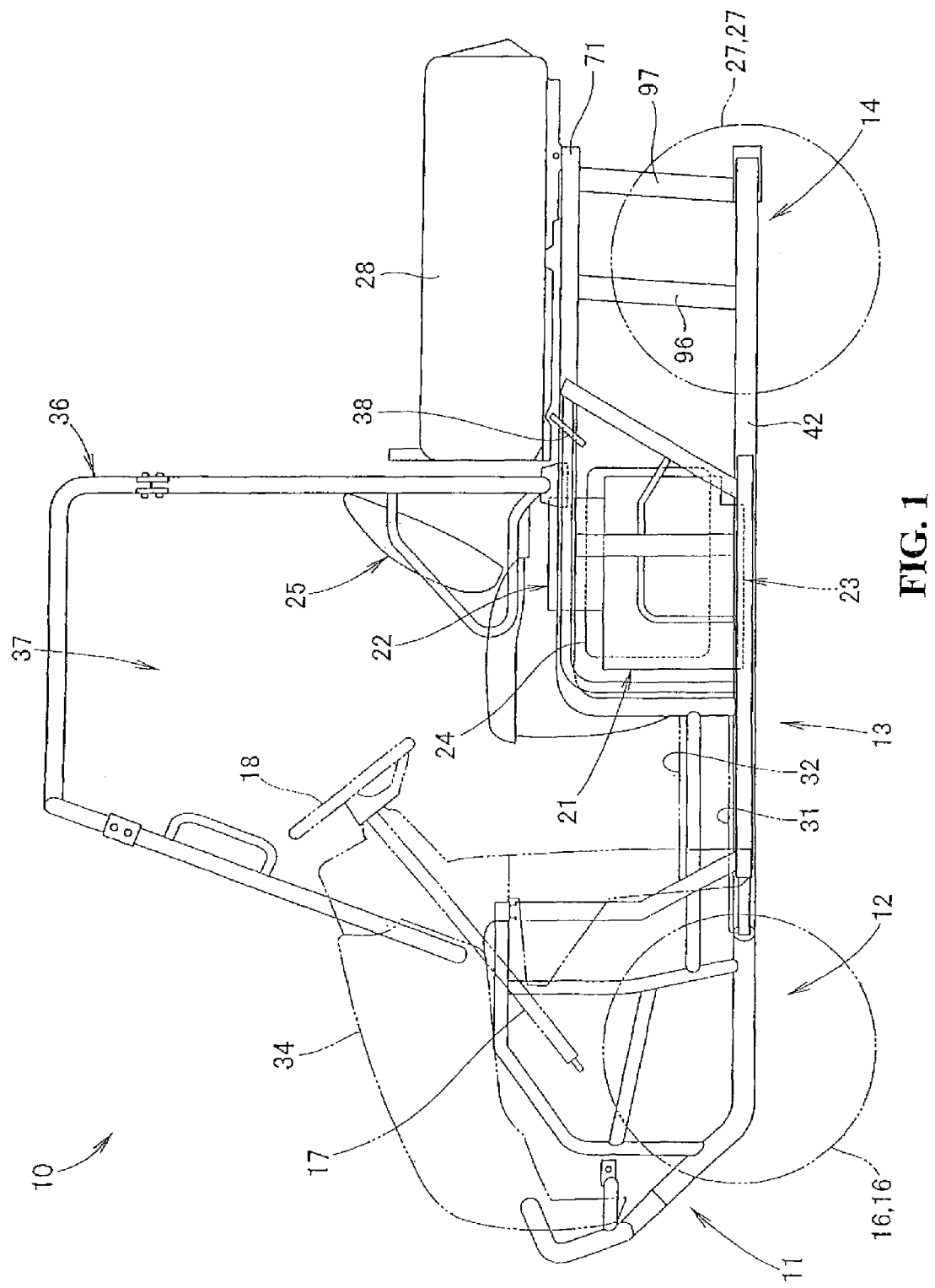
FIG. 1 is a side elevational view showing a vehicle incorporating a frame structure according to an embodiment of the present invention.

The best mode for carrying out the present invention will be described below with reference to the accompanying drawings. The drawings should be viewed in the direction of reference numerals.

FIG. 1 is a side elevational view showing a vehicle incorporating a frame structure according to an embodiment of the present invention. A vehicle 10 is an all terrain vehicle with a vehicle body frame 11 that includes a front frame 12, a center frame 13, and a rear frame 14. The front frame 12 includes a front wheel suspension (not shown), disposed thereon, for suspending left and right front wheels 16, 16. The front frame 12 further includes steering members (a steering shaft 17, a steering wheel 18 disposed on an upper end of the steering shaft 17, and the like) for steering the front wheels 16. The center frame 13 is mounted with a power unit 21 (including an engine 22 and a transmission 23 integrated with the engine 22), a fuel tank 24, and left and right seats 25, 26 (only reference numeral 25 representing the seat on a proximal side is shown). The rear frame 14 is mounted with a rear wheel suspension (not shown) suspending left and right rear wheels 27, 27 and a cargo bed 28 that can be tilted.

The center frame 13 includes a pair of left and right steps 31, 31 (only the step 31 on the proximal side is shown), on which an occupant of the vehicle 10 steps as he or she gets on the vehicle 10, and a floor portion 32, which is one step higher than the step 31. Occupants sitting on the seats 25, 26 place their feet on the floor portion 32. In FIG. 1, a front cover 34 is illustrated together with a roll cage 36 fitted to the front cover 34 and the center frame 13, and a cabin 37 enclosed by the roll cage 36 above the center frame 13.

The cargo bed 28 is pivotally movable about a pivot disposed in a rear upper portion of the rear frame 14. More specifically, operating an operation lever 38 unlocks a cargo bed fixing lock, so that a front portion of the cargo bed 28 can be swung upwardly about the pivot.

Figure 2:
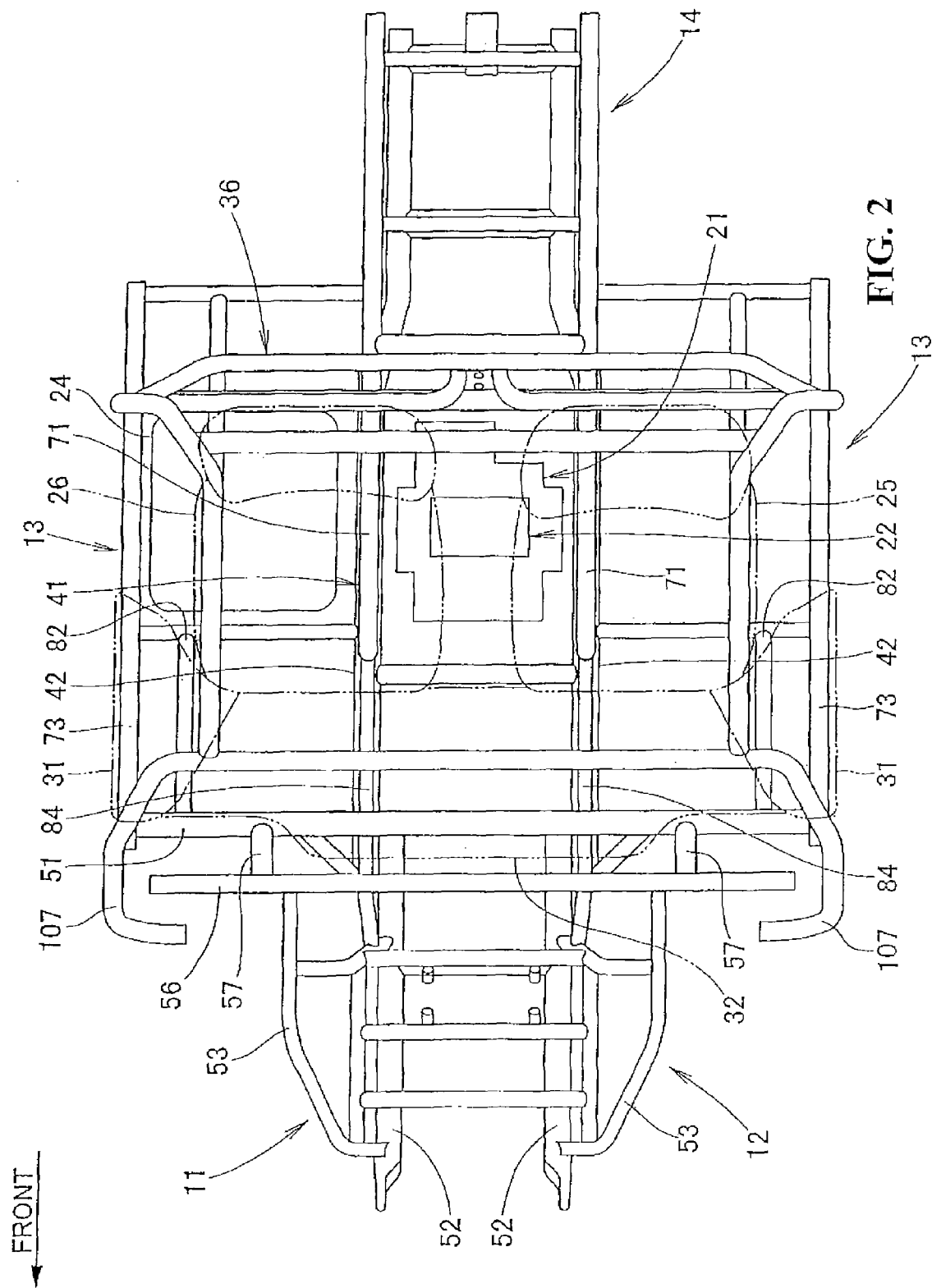
FIG. 2 is a plan view showing the vehicle according to the embodiment of the present invention.

FIG. 2 is a plan view showing the vehicle 10 according to the embodiment of the present invention. A seat support frame 41 supporting the seats 25, 26 is disposed on the center frame 13 of the vehicle body frame 11. The power unit 21 is disposed between a pair of left and right lower main frames 42, 42 extending in a vehicle longitudinal direction at a position downward of the seats 25, 26. The fuel tank 24 is disposed on the right of the power unit 21 and downward of the right seat 26.

Figure 3:
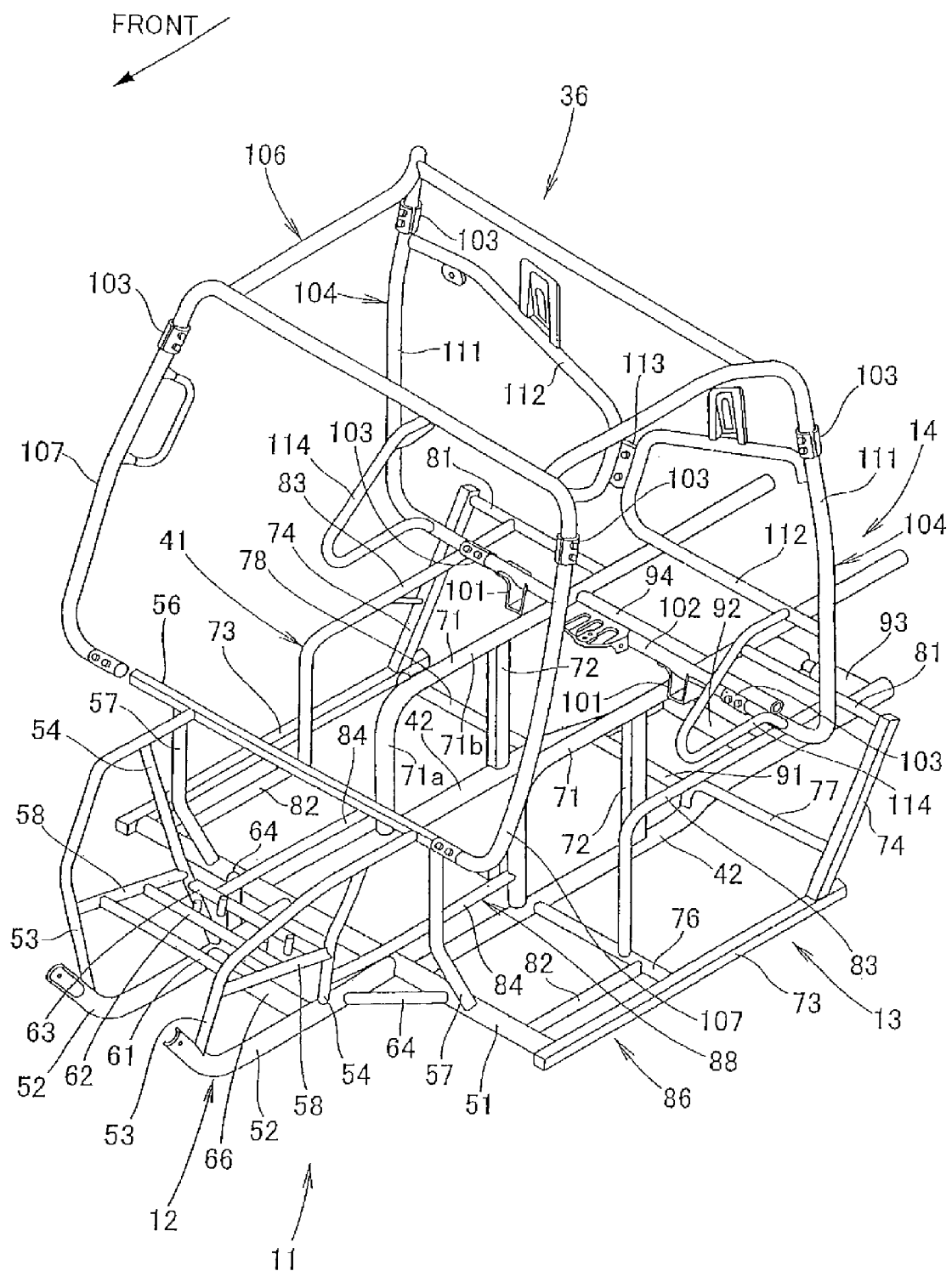
FIG. 3 is a perspective view showing a vehicle body frame and a roll cage according to the embodiment of the present invention.

FIG. 3 is a perspective view showing the vehicle body frame 11 and the roll cage 36 according to an embodiment of the present invention.

The front frame 12 of the vehicle body frame 11 includes a lower cross member 51, a pair of left and right front lower side frames 52, 52, a pair of left and right front first sub-frames 53, 53, a pair of left and right front second sub-frames 54, 54, an upper cross member 56, a pair of left and right connection frames 57, 57, front intermediate frames 58, 58, cross members 61, 62, a cross member 63, reinforcement frames 64, 64, and a cross member 66. More specifically, the lower cross member 51 is disposed at front ends of the lower main frames 42, 42. The front lower side frames 52, 52 extend forwardly from the lower cross member 51. The front first sub-frames 53, 53 are made to rise upwardly from respective front ends of the front lower side frames 52, 52. The front second sub-frames 54, 54 are made to rise upwardly from the respective front lower side frames 52, 52 and have leading ends attached to the front first sub-frames 53, 53. The upper cross member 56 is attached to respective rear ends of the front first sub-frames 53, 53. The connection frames 57, 57 connect the lower cross member 51 with the upper cross member 56. The front intermediate frames 58, 58 are disposed across the front first sub-frames 53, 53 and the front second sub-frames 54, 54. The cross members 61, 62 are disposed across the two front intermediate frames 58, 58. The cross member 63 is disposed across the two front second sub-frames 54, 54. The reinforcement frames 64, 64 are disposed across the lower cross member 51 and the corresponding one of the front lower side frames 52, 52. The cross member 66 is disposed across the two front lower side frames 52, 52.

The front lower side frames 52, 52 and the front intermediate frames 58, 58 are members on which brackets (not shown) are provided for vertically swingably supporting front wheel suspension arms.

The center frame 13 includes the pair of left and right lower main frames 42, 42, a pair of left and right inner seat support frames 71, 71, center riser frames 72, 72, a pair of left and right step outer frames 73, 73, a pair of left and right inclined frames 74, 74, a pair of left and right step front cross members 76, 76 (only reference numeral 76 representing the step cross member on the proximal side is shown), a left rear cross member 77, a right rear cross member 78, a pair of left and right rear upper cross members 81, 81, step sub-frames 82, 82, outer seat support frames 83, 83, and a pair of left and right floor sub-frames 84, 84. More specifically, the inner seat support frames 71, 71 are made to rise upwardly from corresponding ones of the lower main frames 42, 42 and extend rearwardly. The center riser frames 72, 72 are disposed across the lower main frames 42, 42 and horizontal portions of the inner seat support frames 71, 71. The step outer frames 73, 73 extend rearwardly from both ends of the lower cross member 51. The inclined frames 74, 74 extend obliquely upwardly toward the rear from rear ends of the step outer frames 73, 73. The step front cross members 76, 76 are disposed across the lower main frames 42, 42 and the step outer frames 73, 73. The left rear cross member 77 extends inwardly of the vehicle body from an intermediate portion of the left inclined frame 74 and then is bent downwardly to have a leading end fitted to the left lower main frame 42. The right rear cross member 78 is disposed across the right step outer frame 73 and the right lower main frame 42. The rear upper cross members 81, 81 are disposed across rear ends of the inclined frames 74, 74 and the inner seat support frames 71, 71. The step sub-frames 82, 82 are disposed across the lower cross member 51 and corresponding ones of the step front cross members 76, 76. The outer seat support frames 83, 83 are made to rise upwardly from intermediate portions of the step front cross members 76, 76 and extends rearwardly to have leading ends attached to the rear upper cross members 81, 81. The floor sub-frames 84, 84 are disposed across the inner seat support frames 71, 71 and the front second sub-frames 54, 54.

The lower cross member 51, the step outer frames 73, 73, the step front cross members 76, 76, and the step sub-frames 82, 82 constitute a step support frame 86 supporting the steps 31 (see FIG. 1).

The left and right floor sub-frames 84, 84 constitute a floor portion support frame 88 supporting the floor portion 32 (see FIG. 1).

The inner seat support frames 71, 71 and the outer seat support frames 83, 83 constitute the seat support frame 41.

The rear frame 14 includes the left and right lower main frames 42, 42, the left and right inner seat support frames 71, 71, cross members 91 to 93, a cross member 94, a pair of left and right rear first riser frames 96, 96 (see FIG. 1; only the rear first riser frame 96 on the proximal side is shown), and a pair of left and right rear second riser frames 97, 97 (see FIG. 1; only the rear second riser frame 97 on the proximal side is shown). More specifically, the cross members 91 to 93 are disposed across the lower main frames 42, 42. The cross member 94 is disposed across the inner seat support frames 71, 71. The rear first riser frames 96, 96 and the rear second riser frames 97, 97 are disposed across the corresponding ones of the lower main frames 42, 42 and the inner seat support frames 71, 71.

A bracket (not shown) vertically swingably supporting a rear wheel suspension arm is attached to each of the rear first riser frames 96, 96 and the rear second riser frames 97, 97.

The roll cage 36 includes a cross member 102, a pair of left and right rear posts 104, 104, an upper frame member 106, and a pair of left and right front posts 107, 107. More specifically, the cross member 102, which extends laterally, is disposed on the left and right inner seat support frames 71, 71 via brackets 101, 101. The rear posts 104, 104 are connected to the cross member 102 via joints 103, 103. The upper frame member 106 is connected to upper ends of the rear posts 104, 104 via joints 103, 103. The front posts 107, 107 are connected to left and right front portions of the upper frame member 106 via joints 103, 103 and have lower ends attached to the front cover 34 (see FIG. 1).

The rear posts 104, 104 include perpendicular portions 111, 111, inwardly extending portions 112, 112, a connection 113, and armrests 114, 114. More specifically, the perpendicular portion 111 extends horizontally toward an outside of the vehicle body from a connection to the cross member 102 and then extends substantially perpendicularly. The inwardly extended portion 112 has a horizontally oriented U-shape extending inwardly of the vehicle body from the perpendicular portion 111. The connection 113 connects together the inwardly extending portions 112, 112. The armrest 114 is connected to the horizontal portion of the perpendicular portion 111 and the inwardly extended portion 112.

Figure 4:
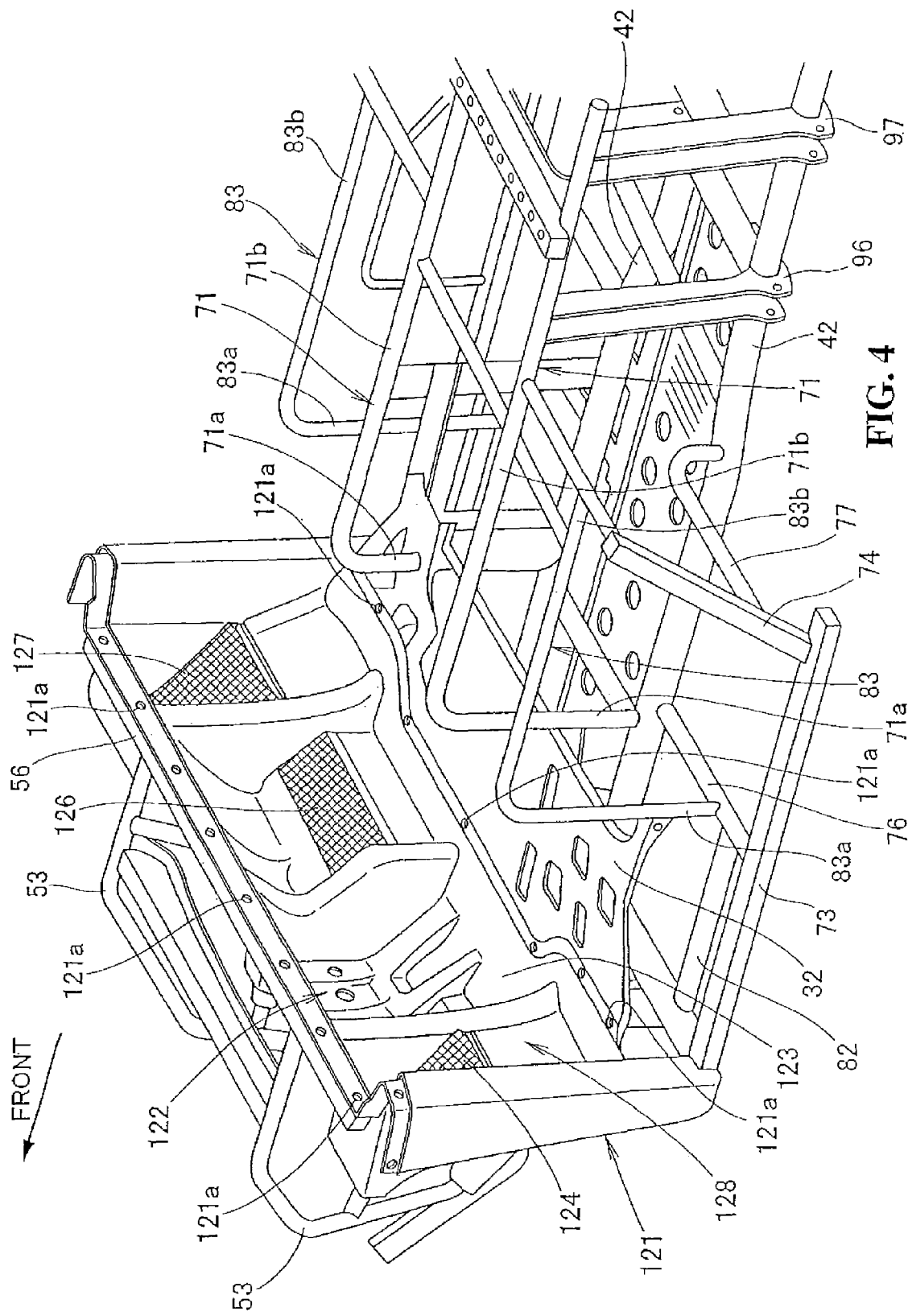
FIG. 4 is a perspective view showing the vehicle body frame and a dash panel according to the embodiment of the present invention.

FIG. 4 is a perspective view showing the vehicle body frame and a dash panel according to the embodiment of the present invention. A dash panel 121 formed of a resin is disposed ahead of the floor portion 32. The dash panel 121 delimits the cabin from a front wheel side.

The dash panel 121 includes a foot operation zone 123, a driver's footrest 124, and passenger's footrests 126, 127. More specifically, the foot operation zone 123 faces a foot operation space 122 in which a driver sitting in the left seat 25 (see FIG. 2) operates an accelerator pedal and a brake pedal with his or her right foot. The driver's footrest 124 is a footrest, on which the driver can rest his or her left foot. The passenger's footrests 126, 127 are footrests, on which a passenger sitting in the right seat 26 (see FIG. 2) can rest his or her feet. It should be noted that the driver's footrest 124 and the passenger's footrests 126, 127 are crosshatched in FIG. 4 for easier identification of positions of these footrests (the same applies hereunder).

The foot operation zone 123 and the driver's footrest 124 constitute a foot operation portion 128.

Each of the driver's footrest 124 and the passenger's footrests 126, 127 is inclined downwardly toward the rear so that the driver and the passenger can rest their feet easily. In FIG. 4, a screw insertion hole 121a is made in an upper edge and a lower edge of the dash panel 121 and is used for attaching the dash panel 121 to the upper cross member 56 and the floor portion 32.

The left rear cross member 77, disposed on the left of the vehicle body frame 11, is disposed at a level higher, for example, than the lower cross member 51. This reduces the likelihood that the left rear cross member 77 will contact a ground surface even when the vehicle is driven on a road surface having excessive irregularities, thus improving the operating performance on rough roads.

Figure 5:
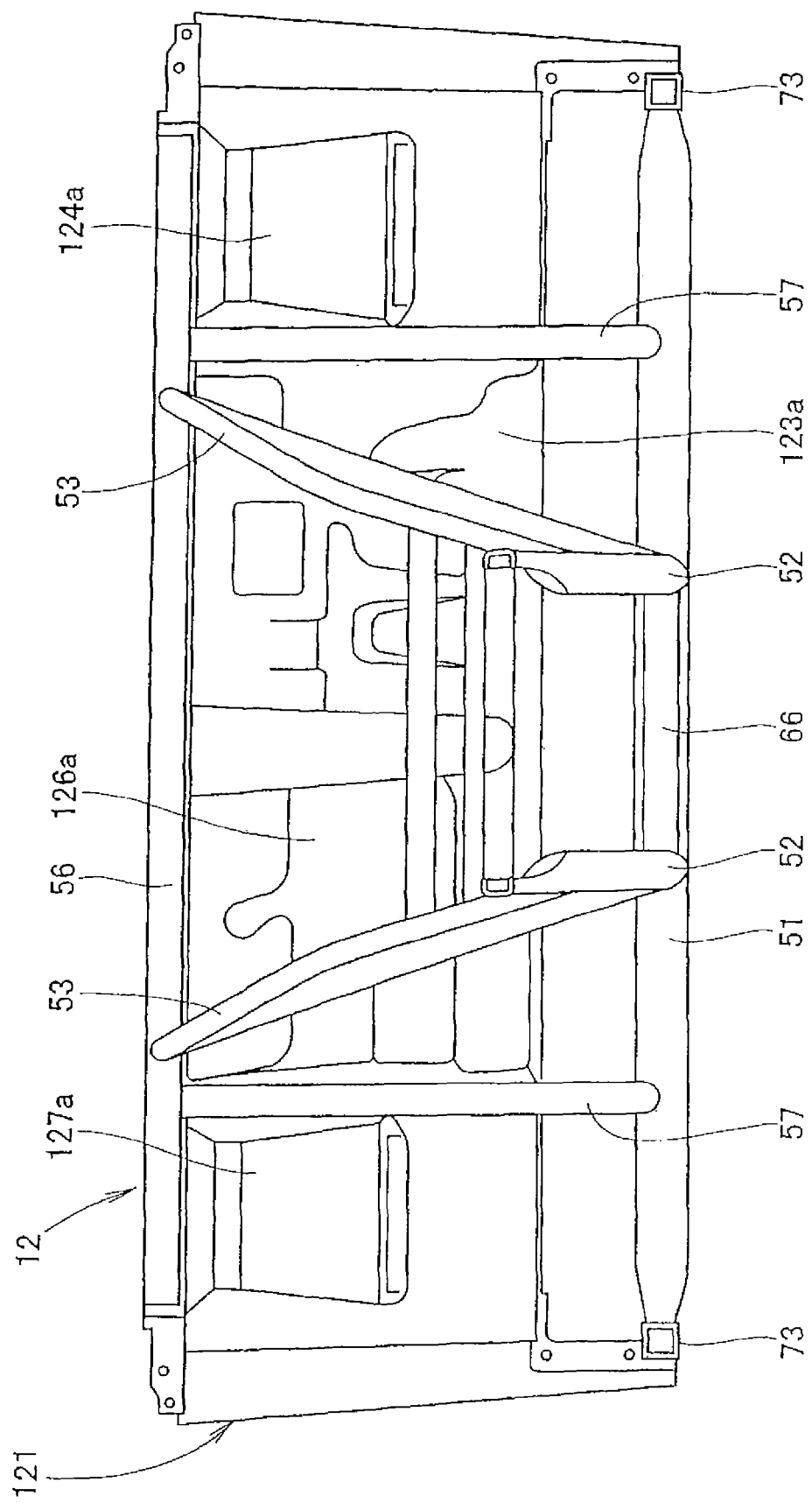
FIG. 5 is a front view showing a front frame and the dash panel according to the embodiment of the present invention.

FIG. 5 is a front view showing the front frame 12 and the dash panel 121 according to an embodiment of the present invention. The dash panel 121 is disposed so as to cover each rearward portion of the upper cross member 56 of the front frame 12 and upper portions of the left and right connection frames 57, 57.

The connection frames 57, 57 extend perpendicularly from respective positions inward of both ends of the lower cross member 51 and the upper cross member 56, thereby connecting the lower cross member 51 with the upper cross member 56. Referring to FIG. 5, a back surface 123a of the foot operation zone 123 is provided together with a back surface 124a of the driver's footrest 124, and back surfaces 126a, 127a of the passenger's footrests 126, 127, respectively.

Figure 6:
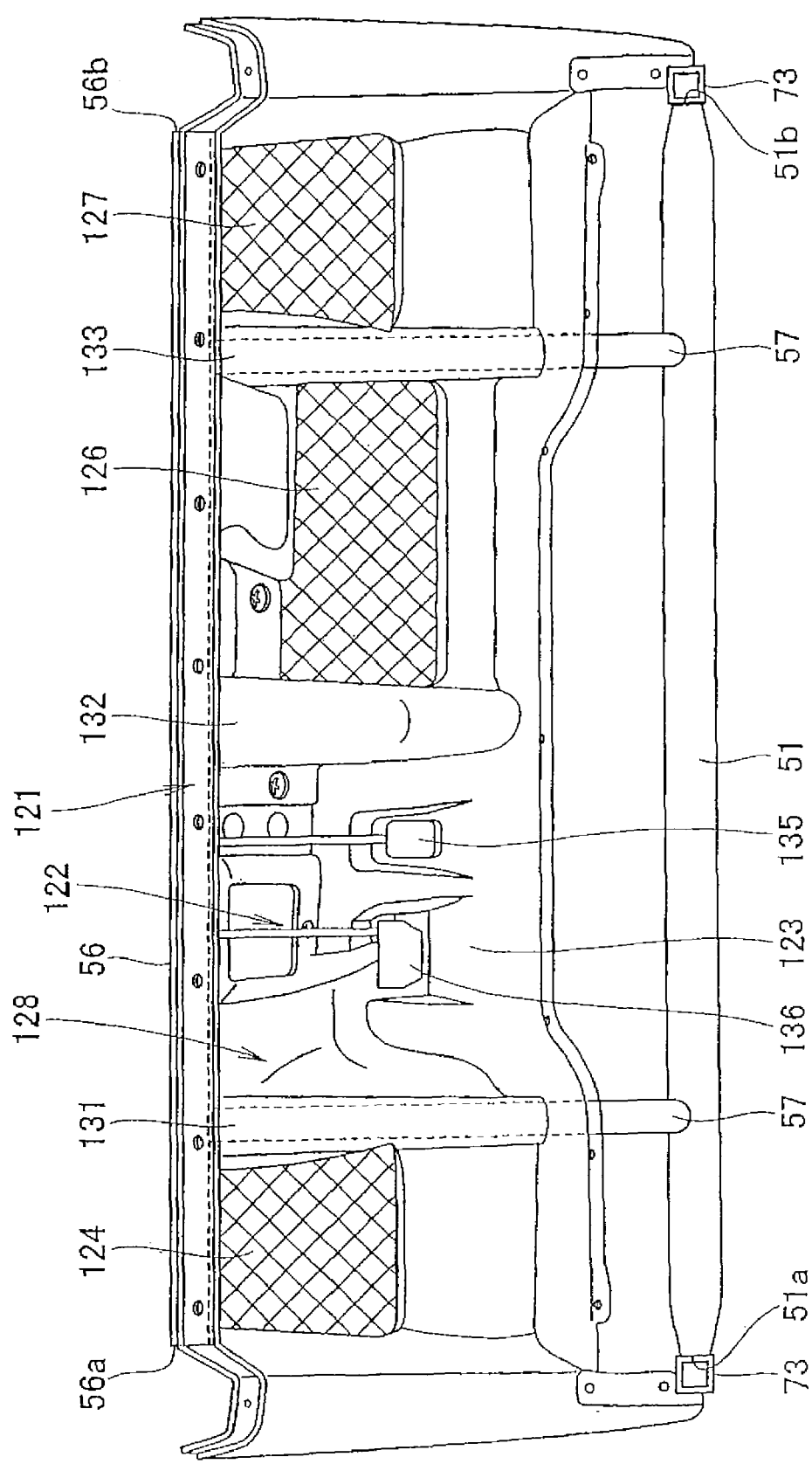
FIG. 6 is a back view showing the dash panel according to the embodiment of the present invention.

FIG. 6 is a back view showing the dash panel 121 according to an embodiment of the present invention. The dash panel 121 has three bulkheads. More specifically, a bulkhead 131 disposed between the foot operation zone 123 and the driver's footrest 124, a bulkhead 132 disposed between the foot operation zone 123 and the passenger's footrest 126, and a bulkhead 133 disposed between the passenger's footrests 126, 127. In FIG. 6, the accelerator pedal 135 and the brake pedal 136 are each operated by the right foot of the driver.

The bulkheads 131 to 133 are curved to protrude toward the rear of the vehicle (to the front in FIG. 6). The connection frames 57, 57 are disposed forward (in the back in FIG. 6) of the bulkheads 131, 133.

The foregoing arrangement, in which the bulkhead 131 is disposed between the foot operation zone 123 and the driver's footrest 124 and the bulkhead 133 is disposed between the passenger's footrests 126, 127, results in the bulkheads 131, 133 protruding rearwardly and being disposed between the two legs each of the driver and the passenger, respectively. The bulkheads 131, 133 do not therefore get in the way. In addition, the bulkheads 131 to 133 serve as reinforcement ribs to enhance the rigidity of the dash panel 121.

The driver's footrest 124 and the passenger's footrest 127 are disposed at a high position in the dash panel 121. This allows the driver and the passenger to support their bodies more easily, when, for example, the vehicle sways largely as it is driven on a road surface having excessive irregularities, by staying on their feet as they exert their forces on the driver's footrest 124 and the passenger's footrest 127.

As shown in FIGS. 1, 3, 4, and 6, an embodiment of the present invention provides a frame structure for the vehicle 10. The vehicle 10 includes the pair of left and right lower main frames 42, 42 extending longitudinally along the vehicle with the front frame 12 including front portions of the lower main frames 42, 42 and supporting front wheels 16, 16. The seat support frame 41 is disposed at intermediate portions of the lower main frames 42, 42 with the seat support frame 41 supporting seats 25, 26 (see FIG. 2). The rear frame 14 is disposed at rear portions of the lower main frames 42, 42 with the rear frame 14 supporting rear wheels 27, 27. The floor sub-frames 84, 84 support the floor portion 32 and serve as a floor, on which occupants sitting in the seats 25, 26 rest their feet. The step sub-frames 82, 82 supporting the steps 31 are one step lower than the floor portion 32. The dash panel 121 is disposed near the floor portion 32 with the dash panel 121 delimiting a side of the cabin 37 from a side of the front wheels 16, 16. The dash panel 121 includes the foot operation zone 123 facing the foot operation space 122, in which the driver of the occupants operates an accelerator pedal, a brake pedal, and other foot operation members with his or her one foot. The driver's footrest 124 is provided on which the driver rests his or her other foot. In the abovementioned vehicle 10, the foot operation portion 128 is disposed between the lower cross member 51 disposed so as to extend laterally across front ends of the pair of left and right lower main frames 42, 42. The upper cross member 56 is disposed upward of, and extends in parallel with, the lower cross member 51. Further, the connection frames 57, 57 are disposed between the foot operation zone 123 and the driver's footrest 124 with the connection frames 57, 57 connecting the lower cross member 51 with the upper cross member 56. Accordingly, the connection frames 57, 57 can receive foot pressure acting on the driver's footrest 124. When the driver rests his or her foot on the driver's footrest 124 to support his or her body during driving, a large load acting on the driver's footrest 124 can be received.

According to another embodiment of the present invention, the bulkhead 131 is formed by curving part of the dash panel 121 between the foot operation zone 123 and the driver's footrest 124 and the connection frame 57 is disposed inside the bulkhead 131. Curving part of the dash panel 121 helps enhance rigidity of the dash panel 121. This also allows the driver's footrest 124 to receive large load. There is also a clear distinction of the boundary between the foot operation zone 123 and the driver's footrest 124, allowing the driver to deploy his or her feet easily.

In accordance with still another embodiment of the present invention, the portions across both ends of the lower cross member 51 and the upper cross member 56 are covered with the dash panel 121. Accordingly, there is no frame involved connecting the ends of the upper cross member 56 and the lower cross member 51. More specifically, no frame between an end 51a and an end 56a, and between an end 51b and an end 56b. This improves the degree of freedom in design of the dash panel 121.

Figure 7:
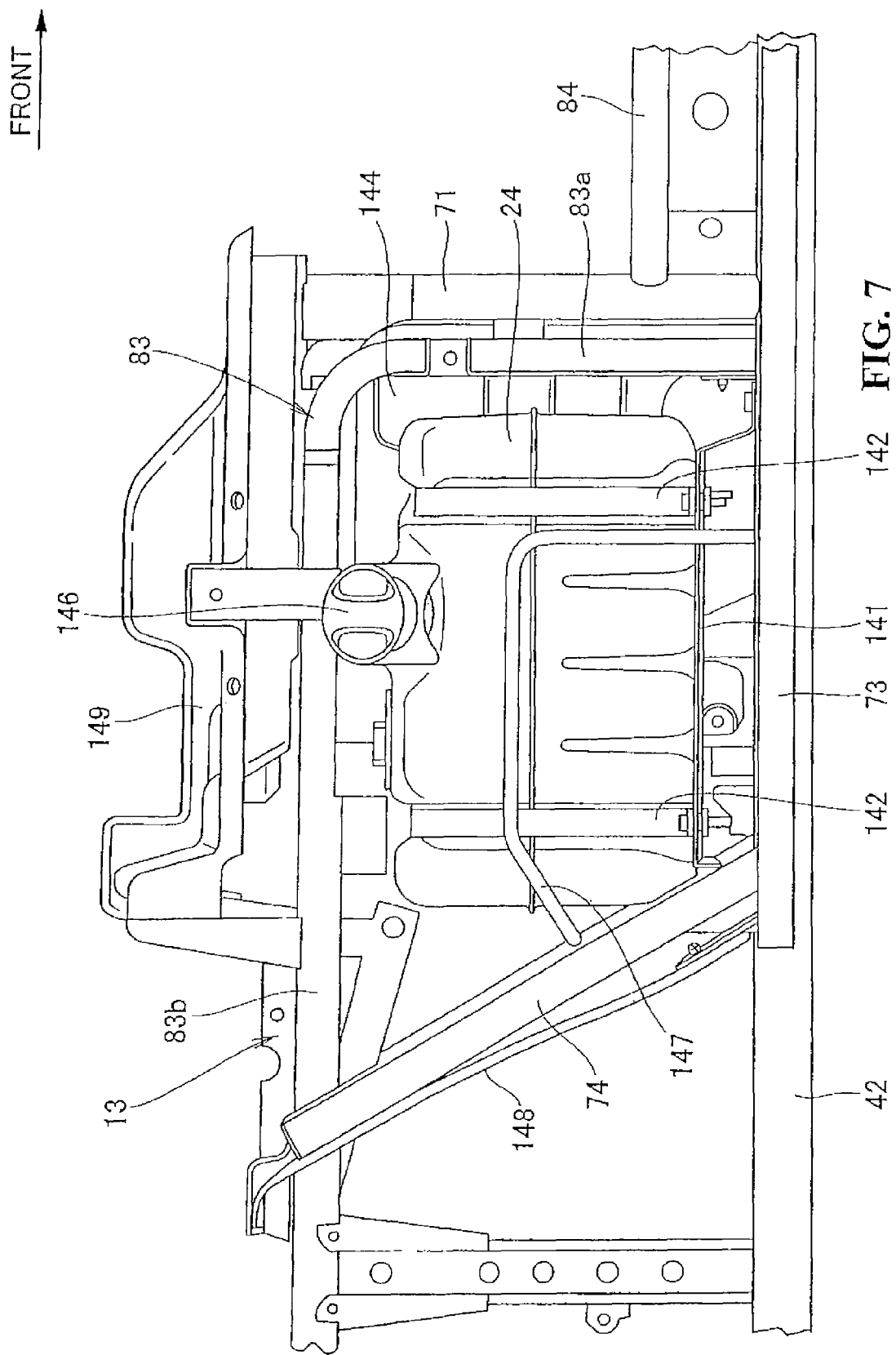
FIG. 7 is a side elevational view showing an arrangement of a fuel tank of the vehicle according to the embodiment of the present invention.

FIG. 7 is a side elevational view showing an arrangement of the fuel tank 24 of the vehicle 10 according to the embodiment of the present invention. A base member 141 is mounted below the center frame 13 and the fuel tank 24 is placed on the base member 141. Further, the fuel tank 24 is then secured to the base member 141 using a pair of band members 142, 142 having both ends attached to the base member 141.

The fuel tank 24 is disposed in a space upward and forward of the lower main frame 42, rearward of a perpendicular portion 83a of the outer seat support frame 83 and downward of a horizontal portion 83b of the outer seat support frame 83, and inward of the step outer frame 73 and the inclined frame 74.

A heat shielding cover 144 for isolating the fuel tank 24 from the power unit 21 (see FIG. 2) is disposed inward of the fuel tank 24.

Referring to FIG. 7, a cap 146 is provided for plugging a fuel filler port of the fuel tank 24, a guard member 147 is attached to the step outer frame 73 and the inclined frame 74 for protecting the fuel tank 24 from a side. A rear cover 148 is disposed rearward of the inclined frame 74 for protecting the fuel tank 24 from the rear. A seat lower cover 149 is provided for covering lower portions of the seats 25, 26 (see FIG. 2).

Figure 8:
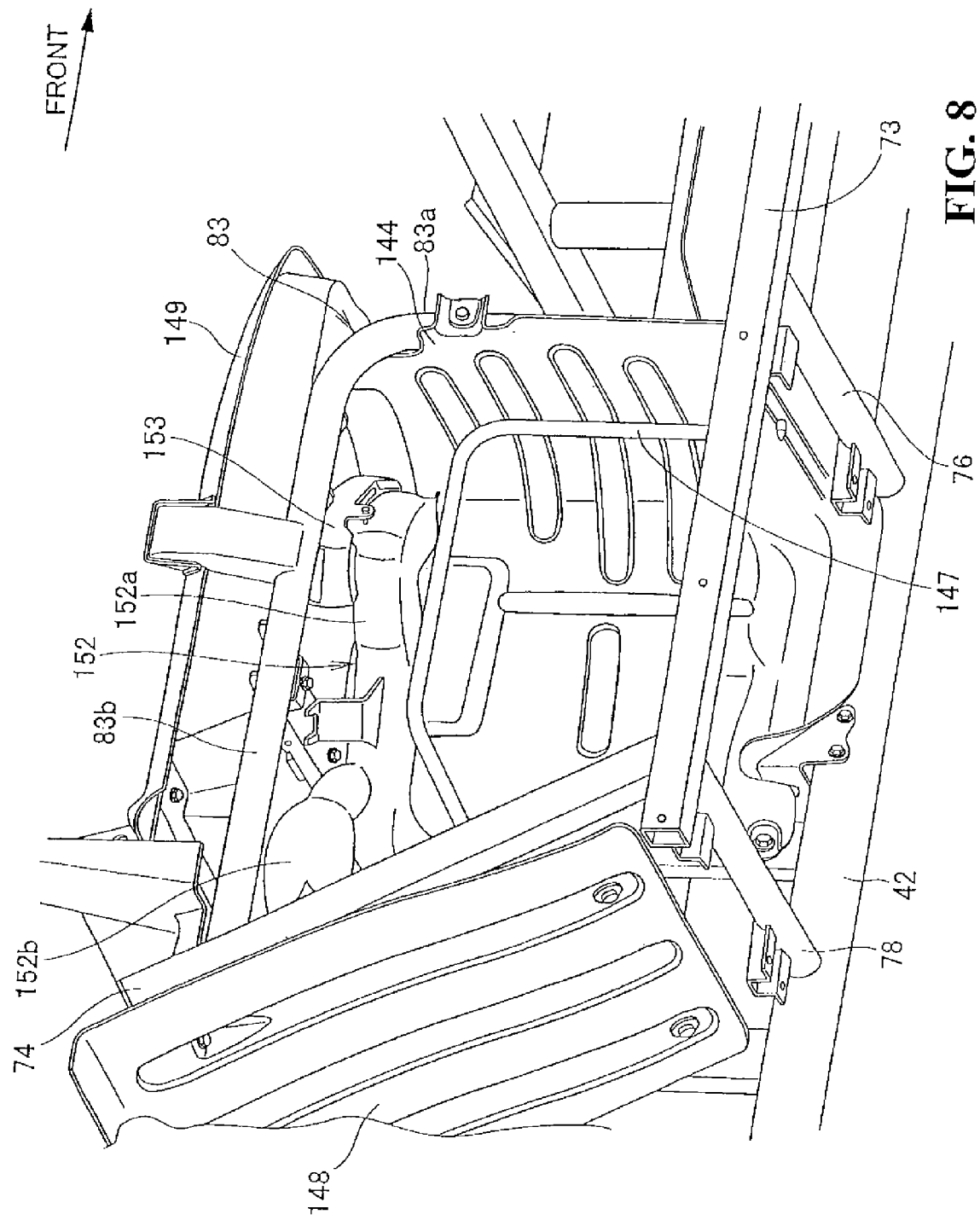
FIG. 8 is a perspective view illustrating a fuel tank space and a heat shielding cover in the vehicle according to the embodiment of the present invention.

FIG. 8 is a perspective view illustrating the fuel tank space and the heat shielding cover 144 in the vehicle 10 according to the embodiment of the present invention. For the sake of convenience, FIG. 8 omits the fuel tank 24 (see FIG. 7).

The heat shielding cover 144 is an L-shaped plate in a plan view. The heat shielding cover 144 has an inward side thereof disposed along the lower main frame 42 and a horizontal portion 71b (see FIG. 3) of the inner seat support frame 71 (see FIG. 3) and a front side thereof disposed so as to plug a space between a perpendicular portion 71a (see FIG. 3) of the inner seat support frame 71 and the perpendicular portion 83a of the outer seat support frame 83.

A front portion of an intake pipe 152 drawing air into an air cleaner (not shown) is disposed above a space, in which the fuel tank 24 is disposed.

The intake pipe 152 includes an intake pipe main body 152a and a resonator 152b integrated with the intake pipe main body 152a. A separate intake duct 153 serving as an air suction port is fitted to a leading end of the intake pipe main body 152a.

Figure 9:
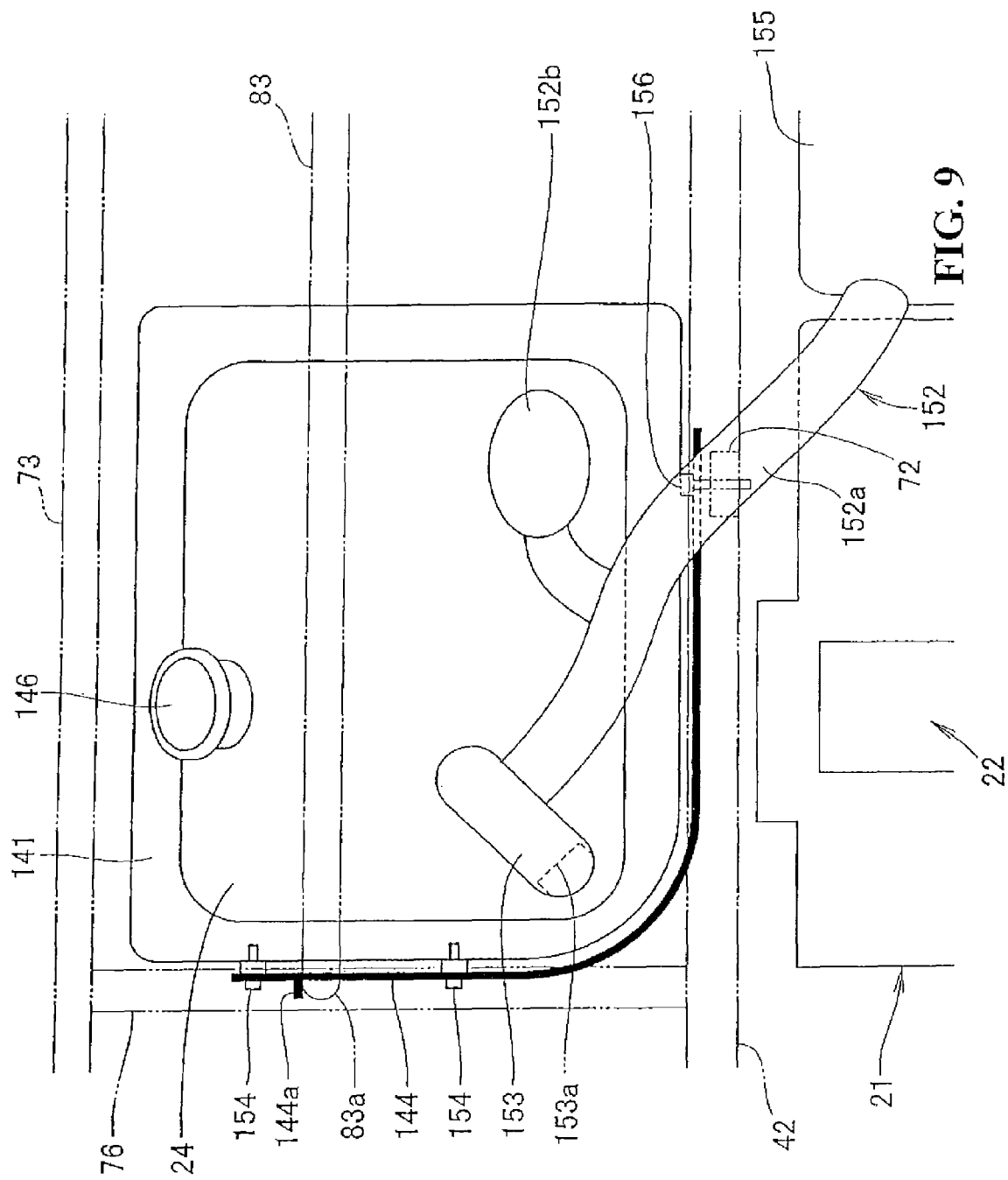
FIG. 9 is a plan view showing a principal part of the vehicle according to the embodiment of the present invention.

FIG. 9 is a plan view showing a principal part of the vehicle 10 according to the embodiment of the present invention. FIG. 9 shows an arrangement, in which the heat shielding cover 144 having an L shape in a plan view (in FIG. 9, the heat shielding cover 144 is painted in black for ease of understanding of the shape thereof) is disposed between the power unit 21 and the fuel tank 24. FIG. 9 also shows that the intake duct 153 having an air intake port 153a is disposed in a space on the side of the fuel tank 24 relative to the heat shielding cover 144. Referring to FIG. 9, a mounting tab 144a is integrally formed with the heat shielding cover 144 for attaching the heat shielding cover 144 to the perpendicular portion 83a of the outer seat support frame 83. Screws 154, 154 are provided for securing the heat shielding cover 144 to the base member 141. A screw 156 is provided for securing the heat shielding cover 144 to the center riser frame 72.

Disposing the intake duct 153 in the space in which the fuel tank 24 is disposed allows air not heated by the engine 22 of the power unit 21 to be drawn into the intake pipe 152. The air can then be supplied to the engine 22 via an air cleaner 155 from the intake pipe 152. This enhances intake charging efficiency for the engine 22.

Figure 10:
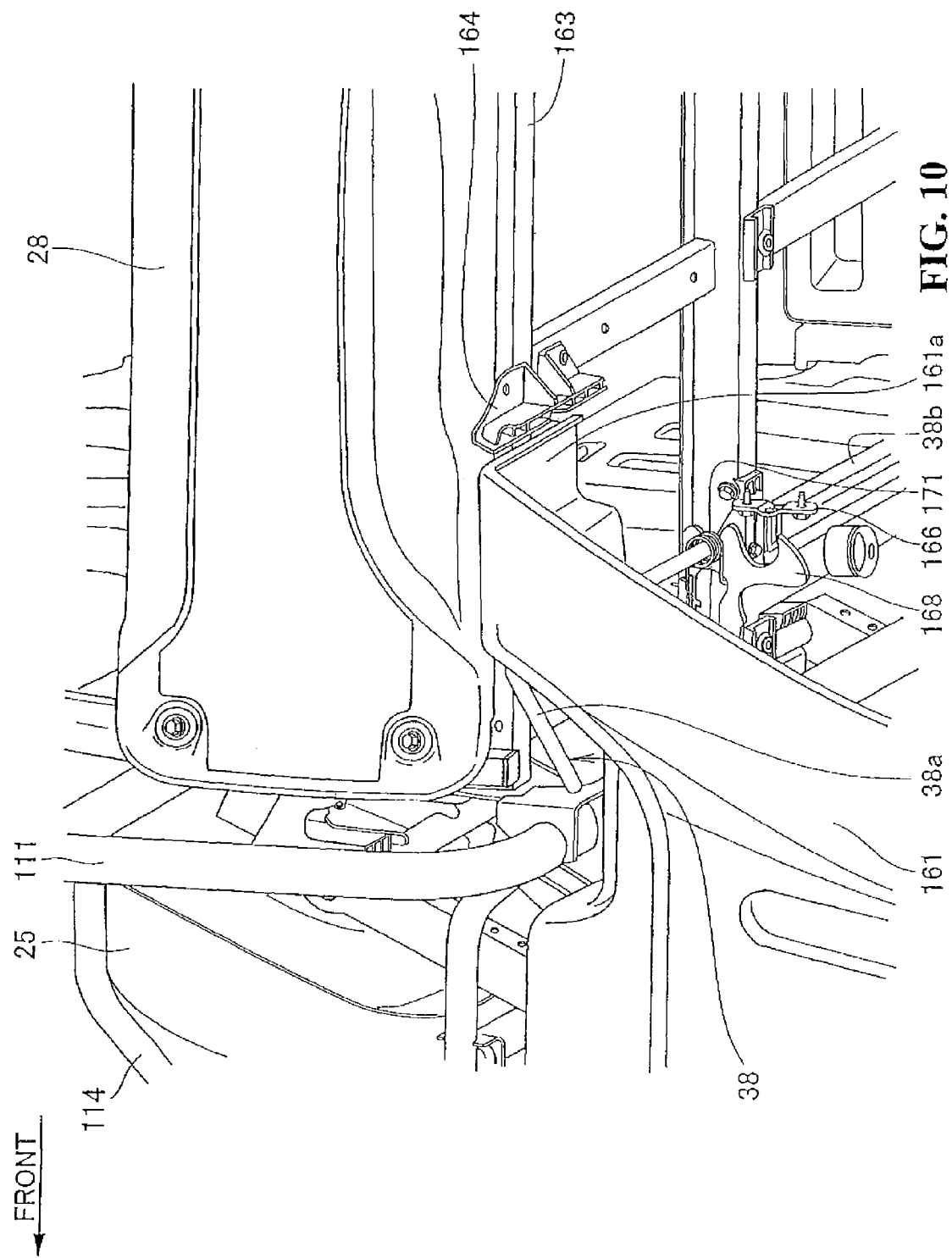
FIG. 10 is a perspective view showing an area near a cargo bed of the vehicle according to the embodiment of the present invention.

FIG. 10 is a perspective view showing an area near the cargo bed 28 of the vehicle 10 according to the embodiment of the present invention. FIG. 10 shows an arrangement, in which a side cover 161 covering a side of the vehicle body includes a cover extension 161a extending inwardly of the vehicle body. The cover extension 161a is disposed at an upper portion in the rear of the side cover 161. FIG. 10 further shows that a pair of left and right mud guards 164, 164 (only the mud guard 164 on the proximal side is shown) are disposed on a pair of left and right cargo bed outer frames 163, 163 (only the cargo bed outer frame 163 on the proximal side is shown) extending longitudinally to constitutes the cargo bed 28. The mud guard 164 is disposed rearward of the cover extension 161a.

The mud guard 164 prevents mud splashed by the rear wheel 27 (see FIG. 1) from entering a gap between the cargo bed 28 and the cover extension 161a of the side cover 161. The mud guard 164 has a mounting portion, with which both of the left and right mud guards 164, 164 can be commonly mounted to the cargo bed outer frame 163.

The operation lever 38 includes a pair of left and right operation portions 38a, 38a (only the operation portion 38a on the proximal side is shown) and a straight portion 38b disposed integrally between the two operation portions 38a, 38a. The operation portions 38a, 38a are operated by hand.

Referring to FIG. 10, an engagement bracket 166 is affixed to the inner seat support frame 71 (see FIG. 3) with a hook 168 mounted in a straight portion 167 and engaged with the engagement bracket 166 by an elastic force of a torsion coil spring 171. The cargo bed 28 is normally in a locked state and the front portion thereof does not swing upwardly, because the engagement bracket 166 is engaged with the hook 168.

Figure 11:
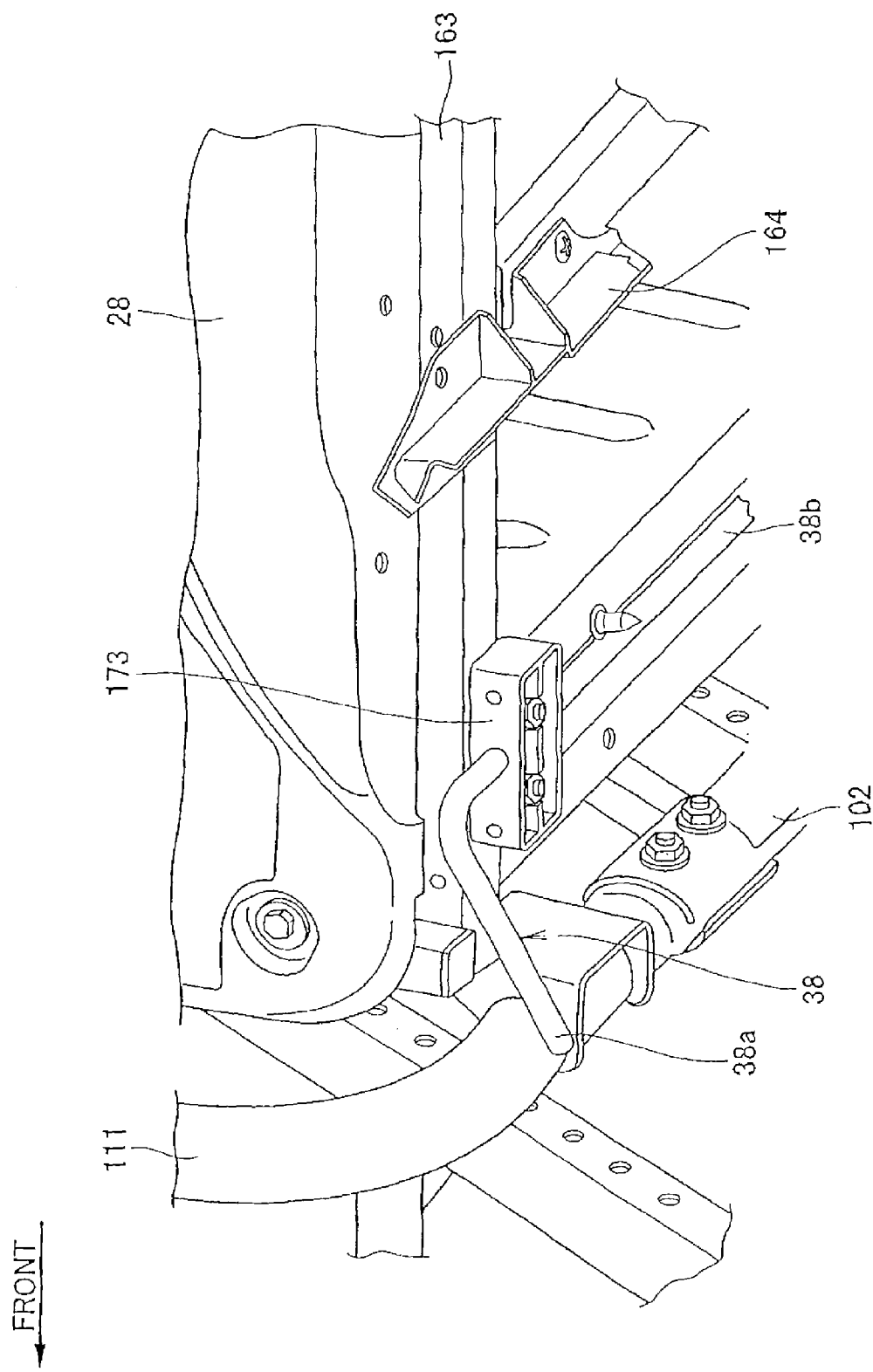
FIG. 11 is a perspective view showing a principal part on an underside of the cargo bed of the vehicle according to the embodiment of the present invention.

FIG. 11 is a perspective view showing a principal part on an underside of the cargo bed 28 of the vehicle 10 according to the embodiment of the present invention. FIG. 11 shows where the side cover 161 shown in FIG. 10 is removed.

A support member 173 is disposed on the cargo bed outer frame 163 at a position forward of the mud guard 164. The support member 173 rotatably supports the straight portion 38b of the operation lever 38.

More specifically, the mud guard 164 prevents mud from sneaking through a gap between the cargo bed 28 and the cover extension 161a (see FIG. 10) of the side cover 161 (see FIG. 10) and entering the portion at which the support member 173 supports the straight portion 38b. Accordingly, the support member 173 ensures smooth rotation of the operation lever 38.

Figure 12:
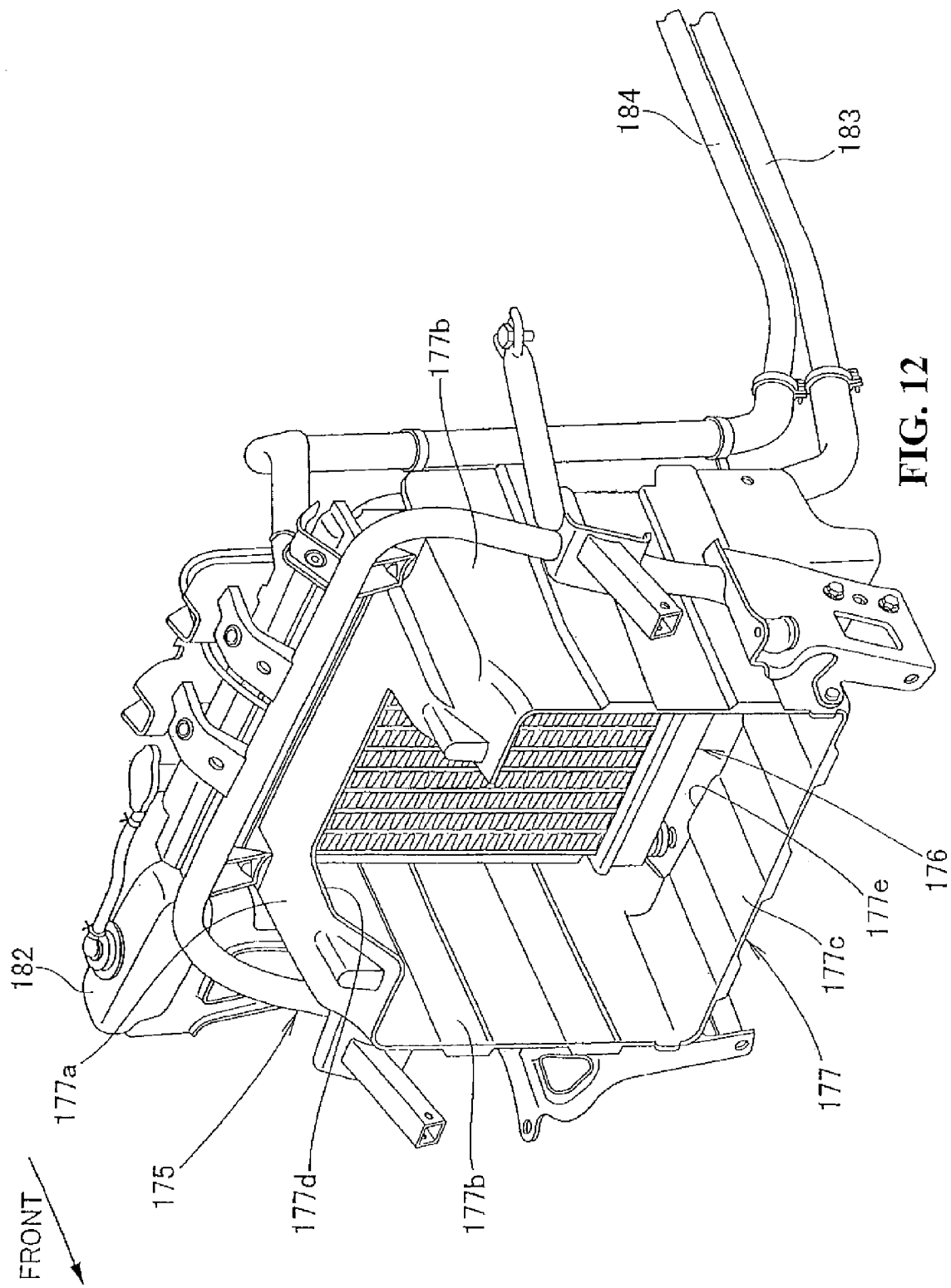
FIG. 12 is a perspective view showing an area around a radiator of the vehicle according to the embodiment of the present invention.

FIG. 12 is a perspective view showing an area around a radiator of the vehicle 10 according to the embodiment of the present invention. FIG. 12 shows that a radiator support frame 175 is disposed at a front portion of the front frame 12 (see FIG. 1). FIG. 12 further shows that the radiator support frame 175 supports upper and lower portions of a radiator 176 and that a wind deflector 177 made of a resin for guiding wind to the radiator 176 is fitted to the radiator support frame 175.

The wind deflector 177 is of a box shape having open front and rear portions. The wind deflector 177 has an upper wall 177a and left and right side walls 177b, 177b attached to the radiator support frame 175. The upper wall 177a includes a cutout 177d made at a front portion thereof. A lower wall 177c has a cutout 177e made at a rear portion thereof.

A front grille not shown is mounted on the front portion of the wind deflector 177. Should a foreign object enter in the wind deflector 177 disposed between the front grille and the radiator 176, the foreign object can be removed through the cutouts 177d, 177e.

Figure 13:
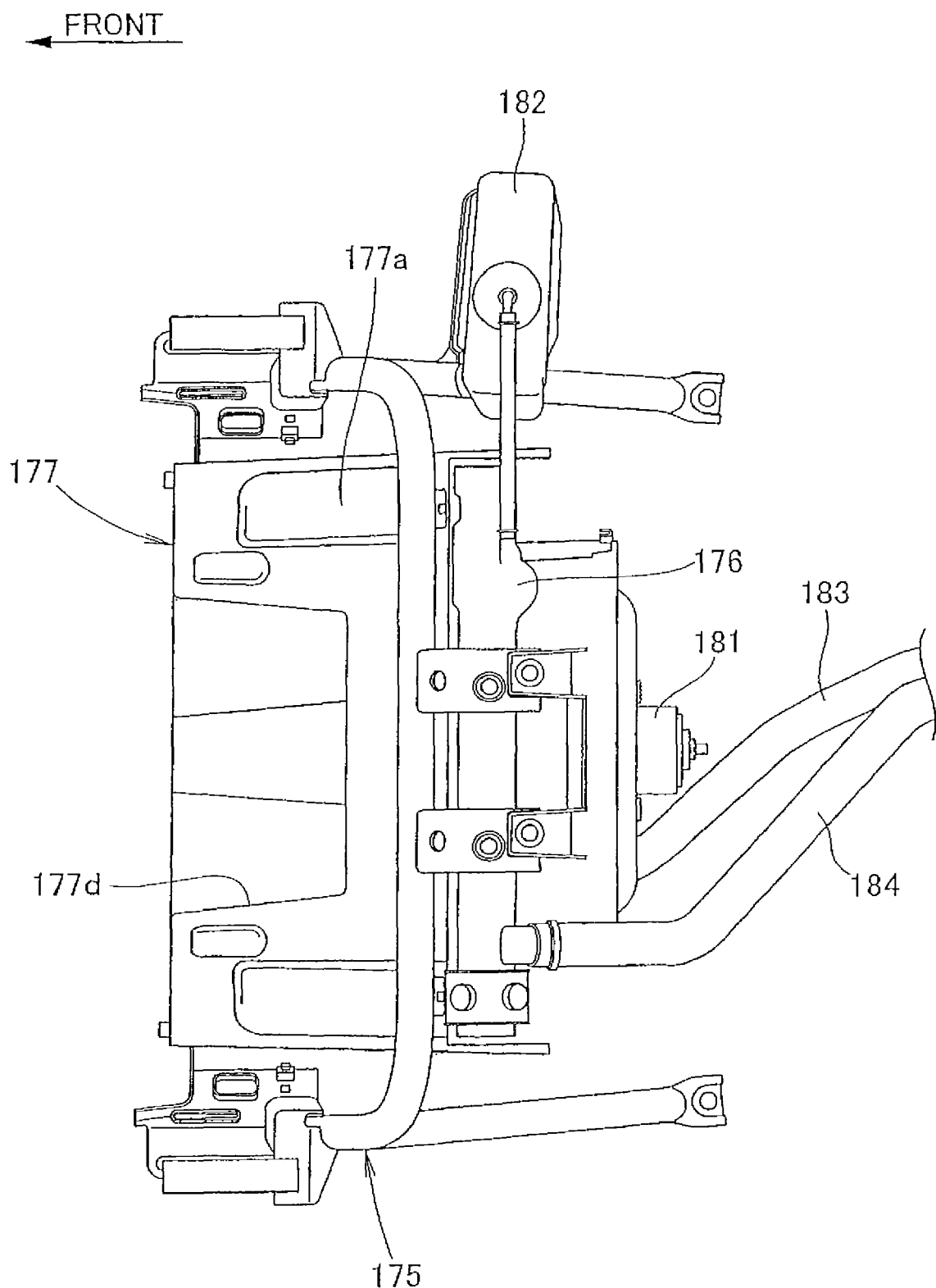
FIG. 13 is a plan view showing an area around the radiator of the vehicle according to the embodiment of the present invention.

FIG. 13 is a plan view showing an area around the radiator 176 of the vehicle 10 according to the embodiment of the present invention. FIG. 13 shows that the cutout 177d having a trapezoidal shape is formed at the front portion of an upper wall 177a of the wind deflector 177. The radiator support frame 175 has an upper portion disposed rearward of the cutout 177d so as to circumvent the cutout 177d such that an inside of the wind deflector 177 can be reached through the cutout 177d. Referring to FIG. 13, a cooling fan 181 is disposed to the rear of the radiator 176 with a reservoir tank 182 for storing coolant that flows in and out of the radiator 176 and radiator hoses 183, 184.

Figure 14:
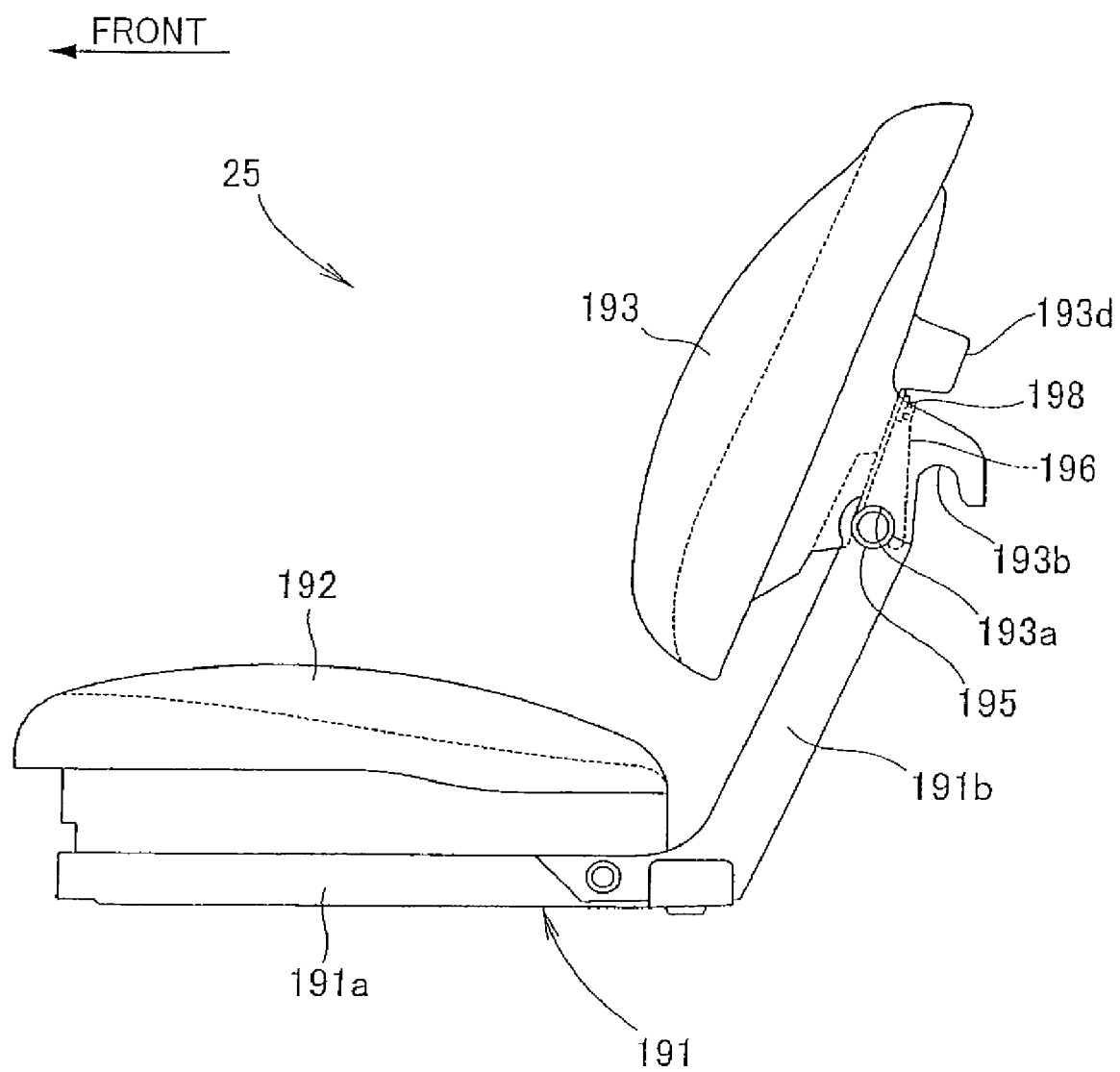
FIG. 14 is a side elevational view showing a seat of the vehicle according to the embodiment of the present invention.

FIG. 14 is a side elevational view showing the seat 25 of the vehicle 10 according to the embodiment of the present invention. The seat 25 includes a seat frame 191, a seat cushion 192, and a seat back 193. More specifically, the seat frame 191 includes a horizontal portion 191a and an inclined portion 191b extending obliquely upwardly toward the rear from a rear end of the horizontal portion 191a. The seat cushion 192 is mounted on the horizontal portion 191a of the seat frame 191. The seat back 193 is disposed at an upper end of the seat frame 191. A position of the seat back 193 is adjustable longitudinally and vertically.

Figure 15:
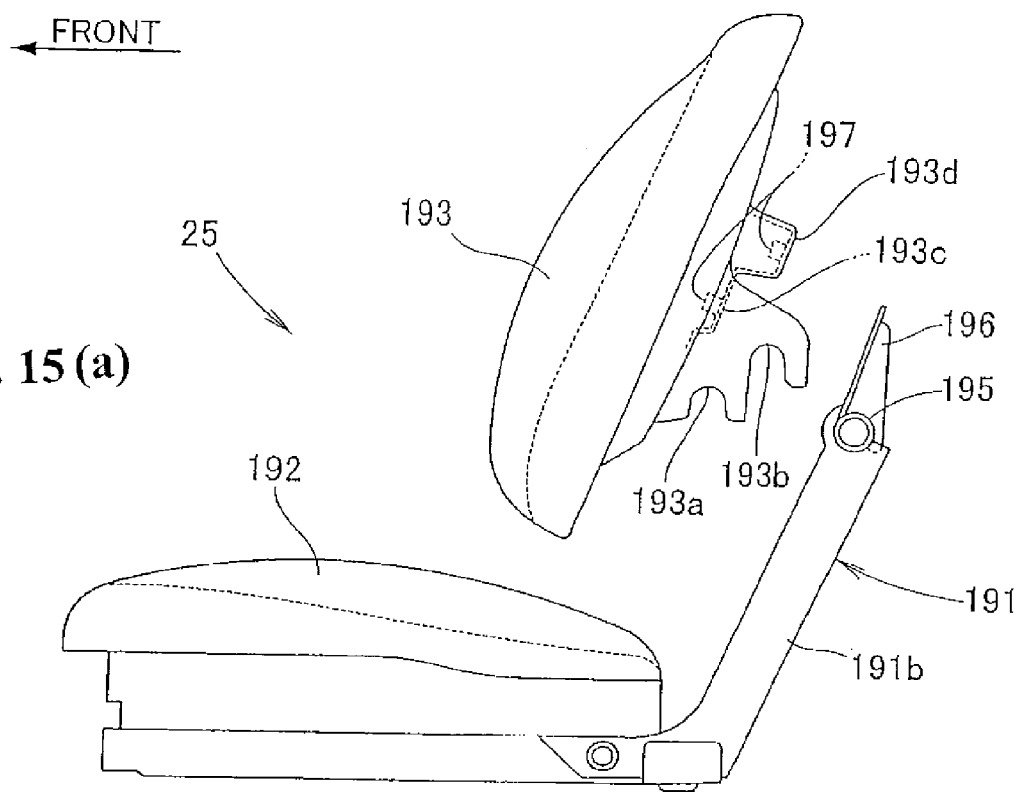
FIGS. 15(a) and 15(b) are views for illustrating in detail a seat structure of the vehicle according to the embodiment of the present invention.
Figure 15:
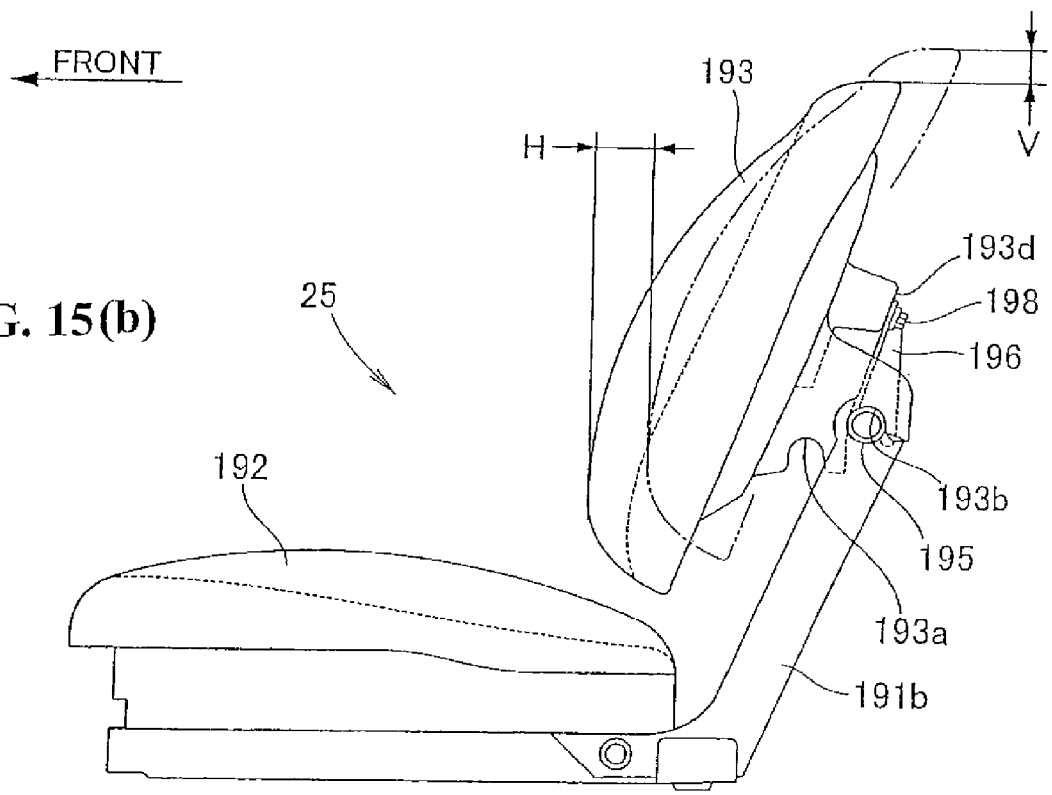

FIGS. 15(a) and 15(b) are views for illustrating in detail a seat structure of the vehicle 10 according to the embodiment of the present invention.

Referring to FIG. 15(a), the inclined portion 191b of the seat frame 191 includes a cross member 195 and a mounting tab 196. The cross member 195 disposed at an upper end of the seat frame 191 extends in a vehicle width direction. The mounting tab 196 extends upwardly from the cross member 195.

The seat back 193 includes a pair of left and right first hooks 193a, 193a (only the first hook 193a on the proximal side is shown), a pair of left and right second hooks 193b, 193b (only the second hook 193b on the proximal side is shown), and a first protrusion 193c and a second protrusion 193d. More specifically, the first hooks 193a, 193a and the second hooks 193b, 193b are formed in a backside of the seat back 193, at which the cross member 195 is hooked. The two hooks 193a, 193a are formed in a stepped fashion, the second hook 193b being higher in level than the first hook 193a. The first protrusion 193b and the second protrusion 193d are formed in a stepped fashion, the second protrusion 193d being higher in level than the first protrusion 193c. Each of the first protrusion 193c and the second protrusion 193d has a nut 197 embedded therein for being mounted to the mounting tab 196 on the side of the inclined portion 191b. The seat 26 (see FIG. 2) has the same structure as the above-described seat 25.

Referring to FIG. 14, the first hooks 193a, 193a of the seat back 193 are hooked onto the cross member 195 and the first protrusion 193c is attached to the mounting tab 196, so that the seat back 193 is disposed more toward the rear and above.

In a condition shown in FIG. 15(b), as compared with the condition shown in FIG. 14, the second hooks 193b, 193b of the seat back 193 are hooked onto the cross member 195 and the second protrusion 193d is attached to the mounting tab 196 by a bolt 198 threadably screwed into the nut 197, so that the seat back 193 is disposed more toward the front and below. In FIG. 15(b), an adjustment amount H of the seat back 193 in the longitudinal direction is provided and an adjustment amount V of the seat back 193 in the vertical direction is provided.

As described above, the seat back 193 of the seat 25 can be adjusted easily through a simple construction according to a build and preference of a person sitting therein.

The frame structure according to an embodiment of the present invention is well adapted for all terrain vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure for a vehicle, the vehicle comprising:
    a pair of left and right lower main frames extending longitudinally along the vehicle;
    a front frame including front portions of the lower main frames, the front frame supporting front wheels;
    a seat support frame disposed at intermediate portions of the lower main frames for supporting seats;
    a rear frame disposed at rear portions of the lower main frames, the rear frame supporting rear wheels;
    floor sub-frames supporting a floor adapted to support feet of occupants sitting in the seats;
    step sub-frames supporting steps which are located lower than the floor; and
    a dash panel disposed near the floor, the dash panel delimiting a side of a cabin from a side of the front wheels, the dash panel including a foot operation zone facing a foot operation space, in which foot operation members, including an accelerator pedal, a brake pedal, and other foot operation members which are adapted to be manually actuated by a first foot of a driver of the vehicle, and a footrest adapted to support a second foot of the driver in a resting state;
    wherein the foot operation zone and the footrest are disposed between a lower cross member disposed so as to extend laterally across front ends of the pair of left and right lower main frames and an upper cross member disposed upward of, and extending in parallel with, the lower cross member; and
    connection frames disposed between the foot operation zone and the footrest, the connection frames connecting the lower cross member with the upper cross member.

2. The vehicle frame structure according to claim 1, wherein a bulkhead is formed by curving part of the dash panel between the foot operation zone and the footrest; and
    the connection frame is disposed inside the bulkhead.

3. The vehicle frame structure according to claim 2, wherein portions across both ends of the lower cross member and the upper cross member are covered with the dash panel.

4. The vehicle frame structure according to claim 1, wherein portions across both ends of the lower cross member and the upper cross member are covered with the dash panel.

5. The vehicle frame structure according to claim 1, wherein the dash panel is formed from a resin material.

6. The vehicle frame structure according to claim 1, wherein the foot operating zone and the footrest are inclined downwardly toward a rear of the vehicle.

7. The vehicle frame structure according to claim 1, and further including at least one footrest adapted to support feet of a passenger, the at least one footrest being disposed adjacent to said foot operation zone.

8. The vehicle frame structure according to claim 7, wherein the at least one footrest for the passenger includes a first and a second footrest which are disposed adjacent to said foot operation zone.

9. The vehicle frame structure according to claim 8, wherein the first footrest for the passenger is disposed at a first predetermined height and the second footrest for the passenger is disposed at a second predetermined height that is higher relative to the first predetermined height.

10. The vehicle frame structure according to claim 1, wherein the foot operation zone is disposed at a first predetermined height and the footrest is disposed at a second predetermined height that is higher relative to the first predetermined height.

11. A frame structure for a vehicle, the vehicle comprising:
    a seat adapted to support occupants of the vehicle in a seated state,
    floor sub-frames for supporting a floor adapted to support feet of the occupants;
    a panel disposed near the floor, the panel delimiting a side of a cabin from a side of front wheels, the panel including a foot operation zone facing a foot operation space, in which foot operation members, including an accelerator pedal, a brake pedal, and other foot operation members adapted to be manually actuated for a first foot of a driver of the vehicle, and a footrest adapted to support a second foot of the driver in a resting state;
    wherein the foot operation zone and the footrest are disposed between a lower cross member disposed so as to extend laterally across front ends of a pair of left and right lower main frames and an upper cross member disposed upward of, and extending in parallel with, the lower cross member; and
    connection frames disposed between the foot operation zone and the footrest, the connection frames connecting the lower cross member with the upper cross member.

12. The vehicle frame structure according to claim 11, wherein a bulkhead is formed by curving part of the panel between the foot operation zone and the footrest; and
    the connection frame is disposed inside the bulkhead.

13. The vehicle frame structure according to claim 12, wherein portions across both ends of the lower cross member and the upper cross member are covered with the panel.

14. The vehicle frame structure according to claim 11, wherein portions across both ends of the lower cross member and the upper cross member are covered with the panel.

15. The vehicle frame structure according to claim 11, wherein the panel is formed from a resin material.

16. The vehicle frame structure according to claim 11, wherein the foot operating zone and the footrest are inclined downwardly toward a rear of the vehicle.

17. The vehicle frame structure according to claim 11, and further including at least one footrest adapted to support feet of a passenger, the at least one footrest being disposed adjacent to said foot operation zone for positioning the feet of the passenger.

18. The vehicle frame structure according to claim 17, wherein the at least one footrest for the passenger includes a first and a second footrest which are disposed adjacent to said foot operation zone.

19. The vehicle frame structure according to claim 18, wherein the first footrest for the passenger is disposed at a first predetermined height and the second footrest for the passenger is disposed at a second predetermined height that is higher relative to the first predetermined height.

20. The vehicle frame structure according to claim 11, wherein the foot operation zone is disposed at a first predetermined height and the footrest is disposed at a second predetermined height that is higher relative to the first predetermined height.

* * * * *